United States Patent Office 3,795,651
Patented Mar. 5, 1974

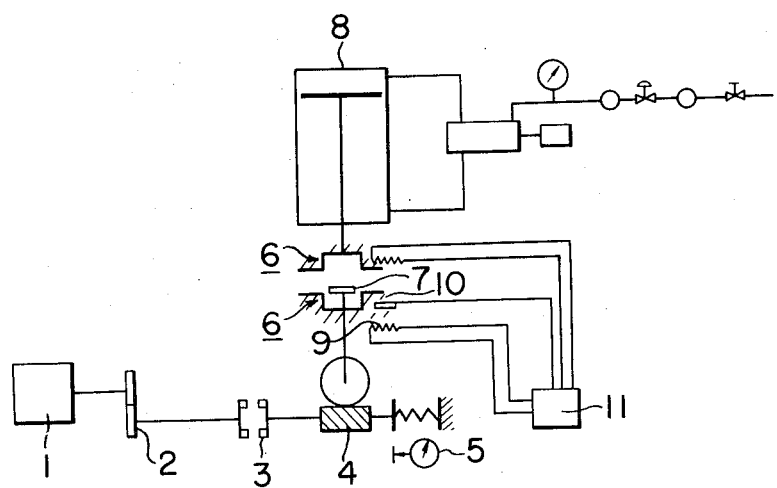

3,795,651
NOVEL RUBBERY COPOLYMER COMPOSITIONS
Koretaka Yamaguchi, 181 Kami-Odanaka, Kawasaki, Japan; Kazuo Toyomoto, 504 Ohkubo-cho, Minami-ku, Yokohama, Japan; Kuniaki Sakamoto, 1–134 Cho-fumine-machi, Ota-ku, Tokyo, Japan; and Toshio Ibaragi, 181 Kami-Odanaka, Kawasaki, Japan
Continuation-in-part of abandoned application Ser. No. 874,640, Nov. 6, 1969. This application July 3, 1972, Ser. No. 268,495
Claims priority, application Japan, Nov. 14, 1968, 43/82,877
Int. Cl. C08c *11/18, 11/22;* C08d *3/08*
U.S. Cl. 260—33.6 AQ                 3 Claims

ABSTRACT OF THE DISCLOSURE

Rubber compositions suitable for tire tread with improved processability comprise from 25 to 75 parts by weight of a process oil having a viscosity-specific gravity constant not less than 0.850 and from 40 to 100 parts by weight of carbon black per 100 parts by weight of a rubber component containing at least 30% by weight of rubbery butadiene-styrene random copolymer polymerized with a lithium based catalyst, said copolymer containing from 5 to 30% by weight of styrene and at least 60% of 1,4-linkage in butadiene units thereof and having a Mooney viscosity from 40 to 150 and a relaxation time from 20 to 200 sec. as measured by a Mooney viscometer.

---

This is a continuation-in-part application of U.S. patent application Ser. No. 874,640 filed Nov. 6, 1969 which application has been abandoned.

BACKGROUND OF THE INVENTION

(1) Field of the invention

This invention relates to rubber compositions of solution polymerized butadiene-styrene copolymer suitable for tire tread with improved processability.

(2) Description of the prior arts

Heretofore, rubbery butadiene-styrene copolymers prepared by emulsion polymerization have been widely used as the rubber material for tire tread and other industrial products. Recently, as disclosed in British Pat. No. 994,726 butadiene-styrene random copolymer rubber has been developed comprising from 10 to 40 percent by weight of styrene and not more than 12% of 1,2-linkage in butadiene units prepared by using lithium based catalysts. Also, in Rubber and Plastic Age, October issue of 1965, page 1144 there is described development of rubbery butadiene-styrene random copolymers containing 25% by weight of styrene and 28% of 1,2-linkage in butadiene units for use as tire tread. The tires made from these rubber materials possess better physical properties for practical use such as abrasion resistance and heat generation on tire travelling than those of emulsion polymerized rubbery butadiene-styrene copolymers.

However, the butadiene-styrene copolymers prepared by solution polymerization, while being of improved physical properties for practical use, are associated with worse properties for processability. For example, they are far inferior in easiness of mixing with fillers such as carbon black by means of a Banbury mixer, banding to an open roll as well as rate of extrusion through an extruder. It is therefore necessary to use these rubbery copolymers blended with the rubbery butadiene-styrene copolymer prepared by emulsion polymerization which is inferior in physical properties for practical use but is superior in properties for processability. Under these circumstances, the excellent physical properties of the former have not been brought into full play.

As stated above, there has been developed no rubber composition provided with combined advantages in both physical properties for practical use and processability. In fact, a compromise has been made between processability and physical properties by the use of a mixture of the rubber materials such as a mixture of emulsion polymerized rubbery butadiene-styrene copolymer and polybutadiene or a mixture of emulsion polymerized rubbery butadiene-styrene copolymer, solution polymerized rubbery butadiene-styrene copolymer and emulsion and solution polymerized rubbery polybutadienes.

SUMMARY OF THE INVENTION

It is an object of this invention to provide rubber compositions composed of a rubbery butadiene-styrene random copolymer in which such disadvantages in processability as those in the rubber compositions of the prior butadiene-styrene random copolymers prepared by solution polymerization for tire tread are eliminated and which exhibit improvements in physical properties for practical use in every respect such as in abrasion resistance, slip resistance on a wet road surface and resistance to heat generation on tire travelling. Other objects will appear hereinbelow.

We have found that these objects of this invention can be accomplished by applying to the rubber material for tire tread butadiene-styrene random copolymer, polymerized with a lithium based catalyst, containing from 5 to 30% by weight of styrene and at least 60% of 1,4-linkage in butadiene units and having a Mooney viscosity ($ML_{1+4}$, 100° C.) from 40 to 150 and a relaxation time from 20 to 200 sec. as measured by means of a Mooney viscometer by the procedures described below.

The Mooney relaxation time measured by a Mooney viscometer as referred to herein is the time for the reading of a Mooney viscometer to become 20% of the Mooney viscosity immediately before stopping of the rotor after measurement of the normal Mooney viscosity (Mooney viscosity at 100° C. at a rotating rate of the rotor of 2 r.p.m.). The relaxation time accordingly represents the stress relaxation character of unvulcanized rubber and will vary depending upon the degrees of cohesive energy and entanglement of the polymer. The greater these degrees the longer is the relaxation time. We have made particularly extensive investigations into the relationship between the relaxation time and physical properties of rubber to find that properties for Banbury processability, especially mixing time of rubber with fillers with Banbury and extrudability are in close relation with the relaxation time and the longer the relaxation the better is the processability. In order to measure the relaxation time by means of a Mooney viscometer, a Mooney viscometer in accordance with ASTM-D-1646 which is provided with a clutch between the driving member and the worm gear in the torque detector is used. The accompanying drawing illustrates a construction of the equipment. In the drawing, there are given a driving member 1, a speed change gear 2, a clutch 3, a worm gear 4, a dial gauge for torque detection 5, a die 6, a rotor 7, an air cylinder 8, a heater 9, a thermometer 10 and a temperature controller 11. The dimensions and other designs are in accord with those in ASTM–D–1646. The gear and the worm gear are designed in such a manner that the rotor is operated at 2 r.p.m. The tested material is placed above and below the rotor, namely within the die, temperature of which is set at 100° C.

Pressure is applied to the air cylinder as high as 1.2 tons and the measurement is made in a usual way, that is, after preheated for 1 min. the rotor is rotated for 4 min., followed by measurement of the Mooney viscosity according to reading of the dial gauge. After 4 minutes' rotation the clutch, preferably an electromagnetic clutch, is put off and the time until reading of the gauge becomes 20% of the Mooney viscosity immediately before release of the clutch is recorded as the relaxation time (sec.).

The relaxation time in a prior solution polymerized butadiene-styrene random copolymer rubber is within the range between 1 and 7 sec. It is almost impossible or very inefficient in productivity to apply a solution polymerized rubbery butadiene-styrene copolymer as such to the processing procedures of rubber products for an emulsion polymerized rubbery butadiene-styrene copolymer or natural rubber, and the excellent physical properties thereof have not effectively manifested themselves in application. The relaxation time of the rubbery butadiene-styrene copolymer used in the compositions of this invention should be in the range from 20 to 200 sec. as stated above and when it is less than 20 sec., the copolymer will be unsatisfactory in processability, especially in extrudability and when it is more than 200 sec., the copolymer will be of unsatisfactory physical properties for practical use as tire tread.

In general, lithium based catalysts are one of few practical catalysts usable for random copolymerization of butadiene and styrene. When polymerization of 1,3-butadiene and styrene in a hydrocarbon solvent is carried out in the presence of a lithium based catalyst, a minor portion of the styrene is combined at random in the resulting rubbery copolymer whereas a major portion thereof is combined as the blocks of styrene at the active ends of the molecules after completion of polymerization of the 1,3-butadiene due to lower rate of polymerization of styrene than that of 1,3-butadiene. Therefore, in order to produce the rubbery random copolymers to be used in the present invention, such a process as disclosed in British Pat. No. 994,726 can be applied, in which a monomer mixture containing a larger amount of styrene is initially prepared and as the polymerization proceeds with a lithium catalyst an additional amount of 1,3-butadiene is continuously or intermittently introduced into the reaction system.

Alternatively, rubbery butadiene-styrene random copolymers can be prepared, as disclosed in British Pat. No. 1,029,445, by using a small amount of an organic alkali metal compound other than the lithium one represented by the general formula RM, R'(YM)$_n$

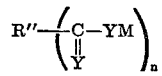

or the like wherein R, R' or R" is a radical selected from saturated aliphatic hydrocarbons, cyclic saturated hydrocarbons and aromatic hydrocarbons, M is an alkali metal other than lithium, Y is oxygen or sulfur and $n$ is an integer from 1 to 3 added to a lithium based catalyst without introduction of additional 1,3-butadiene.

Furthermore, rubbery butadiene-styrene random copolymers can be obtained by the simultaneously use with the lithium based catalyst of an additive with a polar group such as ethers, for example, diethyl ether, tetrahydrofuran, 1,3-dioxane, polyethylene oxide, polypropylene oxide or the like. In the aforementioned preparation, since such additives as cited above tends to increase the content of 1,2-linkage in butadiene units, it is necessary that the addition of additive containing a polar group is controlled in such a way as to produce more than 60% of the 1,4-linkage, namely, less than 40% of the 1,2-linkage.

The processes for producing random copolymers mentioned above also can be applied to the production of rubbery butadiene-styrene random copolymers with a relaxation time from 20 to 200 sec. used in this invention. However, the copolymerization at far higher temperatures for much longer periods of residence time than the polymerization conditions for the prior copolymers is usually employed for the purpose. In the prior processes such as that in British Pat. No. 903,331, random copolymers are produced by the addition of butadiene and styrene to a butyllithiumhexane solution at a rate slower than the normal rate of polymerization. If the copolymerization is effected at higher temperatures, the rate of polymerization will be faster, the rate of addition of the monomer faster and accordingly the average time of residence shorter. For example, in the process described in the examples of said British patent, polymerization temperature of 120° C. is associated with addition times from 50 to 72 min., accordingly the average time of residence is from 25 to 36 min. The copolymers with the relaxation time in such a range as defined in this invention cannot be obtained under such conditions as mentioned above. In general, these copolymers can be produced by the continuous process rather than the batch process. In the continuous process the copolymerization is carried out effectively at a temperature higher than 140° C. with an average time of residence longer than 60 min. Butadiene-styrene random copolymers with a relaxation time from 20 to 200 sec. are usually obtained under the polymerization conditions from 120° C. to 180° C. with a residence time of 60 min. or from 120° C. to 170° C. with the residence time of 120 min. By the process of copolymerization described above are produced rubbery copolymers with much highly branched structures.

As lithium based catalyst used for carrying out the present invention are mentioned, for example, metallic lithium, methyllithium, ethyllithium, butyllithium, amyllithium, hexyllithium, 2-ethylhexyllithium, phenyllithium, various tolyllithiums, xylyllithiums, α-naphthyllithium, methylenedilithium, ethylenedilithium, trimethylenedilithium, tetramethylenedilithium, pentamethylenedilithium, 1,4-dilithiumbenzene, 1,5-dilithiuminaphthalene and the like.

It is necessary for the rubbery butadiene-styrene random copolymers used in this invention to contain from 5 to 30% by weight of styrene. The copolymers containing less than 5% of the combined styrene have inferior physical properties for practical use, particularly disadvantageous in control stability on a wet road surface. With more than 30% adverse effects are produced in the physical properties, particularly in abrasion resistance and heat generation on tire travelling.

The rubbery butadiene-styrene copolymers employed in this invention are required to have a Mooney viscosity from 40 to 150. The copolymers with a Mooney viscosity less than 40 provide adverse physical properties for practical use, and on the other hand, a Mooney viscosity more than 150 leads to worse extrudability and dispersability of fillers such as carbon black during the processing and is disadvantageous for the physical properties for practical use.

The butadiene combined in the rubber butadiene-styrene random copolymers used in this invention must have at least 60% of 1,4-linkage. When the proportion of the 1,4-linkage is less than 60%, the physical properties for practical use as tire tread, partciularly abrasion resistance and heat generation on tire travelling will be adversely affected.

The rubbery butadiene-styrene random copolymer used in this invention either alone or in combination with natural and/or other synthetic rubbers is mixed with a variety of compounding agents, processed and submitted to practical use. In general, the copolymer may be used alone for the rubber material of tire tread but, depending upon the nature and use of the tire, may be used in combination with natural and/or other synthetic rubbers with synergistic effects.

Synthetic rubbers used in combination with a rubbery butadiene-styrene random copolymer applied to the present invention include emulsion polymerized butadiene-styrene copolymer rubber, emulsion polymerized polybutadiene rubber, solution polymerized low-cis or high-cis polybutadiene rubber, polybutadiene rubbers or butadiene-styrene copolymer rubber polymerized with alfin catalysts, polyisoprene rubber, butadiene-isoprene copolymer rubber and the like. Combined use with polybutadiene rubber and/or emulsion polymerized butadiene-styrene copolymer is particularly preferred in view of processability and physical properties for practical use as tire tread.

These natural and/or synthetic rubbers are used either alone or in combination of two or more, and in order to make the most of the characteristics properties of the rubbery butadiene-styrene random copolymers applied to the present invention must be contained in the rubber component used in tire tread compositions as much as at least 30% by weight.

As the compounding agents with the rubbery butadiene-styrene random copolymers alone or in combination with natural and/or other synthetic rubbers applied to the rubber compositions of this invention are especially important the process oil and carbon black in view of physical properties for practical use.

The process oil employed as the rubber compounding agent is composed of high boiling fractions of petroleum. Based upon the chemical structure of hydrocarbon molecules in the oil it is classified in the paraffin series composed of saturated chain hydrocarbons, the naphthene series composed of saturated cyclic hydrocarbons and the aromatic series composed of unsaturated cyclic hydrocarbons. It is usually classified depending upon the viscosity-specific gravity constant (abbreviated as V.G.C.), generally one with V.G.C. from 0.790 to 0.849 being classified in the paraffin series, one with V.G.C. from 0.850 to 0.899 in the naphthene series and one with V.G.C. of 0.900 or higher in the aromatic series. As the process oil used in tire tread of this invention is used a naphthene or aromatic series process oil having V.G.C. of 0.850 or higher and the most preferred one is an aromatic series process oil with V.G.C. of 0.900 or higher. The process oil is added in the present invention in an amount from 25 to 75 parts by weight per 100 parts by weight of the rubber component. Addition of the process oil in an amount less than 25 parts by weight will not result in successful dispersion of the filler and vulcanizing accelerator and more than 75 parts by weight will deteriorate the physical properties of vulcanized rubber.

The process oil used in this invention may be mechanically mixed simultaneously with other compounding agents by means of a Banbury mixer or open roll or it may be used by mixing the entire amount or a portion thereof in solution with the rubbery butadiene-styrene copolymer to be applied to the present invention followed by removal of the solvent to give an oil extended polymer.

The type and amount of the carbon black to be incorporated into rubber as a compounding agent exert a great influence upon the physical properties for the practical use as a tire. The amount of carbon black incorporated in the present invention is determined in consideration of the amount of process oil added and is from 40 to 100 parts by weight per 100 parts by weight of the rubber component. Use of an amount less than 40 parts by weight will be insufficient to give satisfactory dynamic properties for practical use, particularly abrasion resistance.

The nature of carbon black used in this invention may be essentially the same as that used in the emulsion polymerized rubbery butadiene-styrene copolymers or in polybutadiene. Carbon black of HAF grade having a particle size of 40 m$\mu$ or carbon black of ISAF grade having a particle size of approximately 27 m$\mu$ is usually employed. Carbon black having a larger or smaller particle size also may be used depending upon the travelling conditions of the tire. As stated above, the amount and nature of carbon black used should be adequately selected in view of the travelling conditions of the tire.

The carbon black used in this invention may be mechanically mixed on a Banbury mixer or open roll with process oil and other compounding agents or it may be used as the carbon black master batch, which is prepared by adding the entire amount or a portion of carbon black to a solution of the copolymer rubber followed by removal of the solvent.

In addition to process oil and carbon black, the compounding agents used in this invention may include zinc oxide, stearic acid, antioxidants, ozone deterioration retarders, vulcanizing accelerators, vulcanizing agents, wax and the like.

The rubber compositions as described above, which comprise the above-mentioned compounding agents and a rubbery butadiene-styrene random copolymer containing from 5 to 30 percent by weight of styrene and at least 60% of 1,4-linkage in butadiene units and having a Mooney viscosity from 40 to 150 and a relaxation time from 20 to 200 sec., were found to be of well balanced and excellent physical and processing properties for practical use as tire tread compositions.

DESCRIPTION OF THE PREFERRED EMBODIMENTS

The effects of this invention are illustrated by the following examples but they are to be understood as not limiting the scope of this invention.

EXAMPLE 1

Four reactors, each 15m.$^3$ in volume and equipped with a jacket, were connected in series with pipes. The first reactor was fed continuously with predetermined amounts of butadiene, styrene, hexane and n-butyllithium by means of a metering pump. Into the second, third and fourth reactors respectively were fed predetermined amounts of butadiene and hexane by means of a metering pump. After the reaction in the fourth reactor, a hexane solution of 2,4-tertiarybutyl-p-cresol in an amount of 0.5 g. per 100 g. of the polymer was added to give rubbery random copolymers of butadiene and styrene with a variety of relaxation times. Thereafter, an aromatic process oil in an amount of 37.5 parts by weight per 100 parts by weight of the polymer was continuously fed followed by removal of the hexane to give oil extended polymers.

The polymerization conditions and the representative properties of the resulting rubbery copolymers are given in Table 1.

TABLE 1

| Rubbery butadiene-styrene copolymer | A (Example) | B (Comparative example) | C (Comparative example) |
| --- | --- | --- | --- |
| Polymerization condition: | | | |
| Reactor 1: | | | |
| Hexane feed rate (kg./hr.) | $80.0 \times 10^2$ | $80.0 \times 10^2$ | $53.4 \times 10^3$ |
| Butadiene feed rate (kg./hr.) | $12.2 \times 10^2$ | $12.2 \times 210^2$ | $8.2 \times 10^3$ |
| Styrene feed rate (kg./hr.) | $6.3 \times 10^2$ | $6.3 \times 10^2$ | $4.2 \times 10^3$ |
| n-Butyllithium feed rate (kg./hr.) | 1.5 | 1.0 | 6.6 |
| Reactor 2: | | | |
| Hexane feed rate (kg./hr.) | $11.2 \times 10^2$ | $11.2 \times 10^2$ | $7.4 \times 10^3$ |
| Butadiene feed rate (kg./hr.) | $3.7 \times 10^2$ | $3.7 \times 10^2$ | $2.4 \times 10^3$ |
| Reactor 3: | | | |
| Hexane feed rate (kg./hr.) | $5.6 \times 10^2$ | $5.6 \times 10^2$ | $3.8 \times 10^3$ |
| Butadiene feed rate (kg./hr.) | $1.9 \times 10^2$ | $1.9 \times 10^2$ | $1.2 \times 10^3$ |
| Reactor 4: | | | |
| Hexane feed rate (kg./hr.) | $2.8 \times 10^2$ | $2.8 \times 10^2$ | $1.8 \times 10^3$ |
| Butadiene feed rate (kg./hr.) | $0.9 \times 10^2$ | $0.9 \times 10^2$ | $0.6 \times 10^3$ |
| Polymerization temperature (inner) (° C.) | 130 | 80 | 130 |
| Average residence time (hr.) | 3.0 | 3.0 | 0.5 |
| Content of bound styrene [1] | 25.0 | 24.8 | 24.9 |
| Content of block styrene [2] | 0.5 | 0.3 | 0.5 |
| Butadiene bonding pattern (percent:[1]) | | | |
| Cis-1,4-linkage | 40.5 | 40.5 | 40.5 |
| Trans-1,4-linkage | 48.5 | 49.0 | 48.5 |
| 1,2-linkage | 11.0 | 10.5 | 11.0 |
| Mooney viscosity ($ML_{1+4}$, 100° C.) | 105.0 | 103.5 | 105.0 |
| Relaxation time (sec.) [3] | 98.0 | 6.5 | 7.0 |
| Mooney viscosity after the oil extension | 43.0 | 41.0 | 44.0 |

[1] Styrene content and butadiene bond structure were measured using an infrared spectrophotometer and calculated according to the method of Hampton.

[2] To a solution of 2 parts by weight of the butadiene-styrene copolymer in 100 parts by weight of carbon tetrachloride were added 5 parts by weight of tertiarybutyl hydroperoxide and then 0.01 part by weight of osmium tetroxide. The mixture was heated at 80° C. for 15 min. to effect the decomposition. Precipitates formed by adding a large amount of methanol to the resulting solution are the block styrene. The precipitates were separated by filtration, dried in vacuo, weighed and the amount of block styrene calculated as percent by weight in the rubbery butadiene-styrene copolymer.

[3] Relaxation time of the rubber prior to oil extension (measured according to the method described above).

The three solution polymerized, oil extended rubbery butadiene-styrene copolymers thus prepared and an emulsion polymerized, oil extended rubbery butadiene-styrene copolymer (SBR–1712) were compounded in the proportions indicated in Table 2 by means of a Banbury mixer of type B.

TABLE 2

| | Parts by weight |
| --- | --- |
| Oil extended copolymer rubber | 137.5 |
| Aromatic process oil [1] | 12.5 |
| HAF grade carbon black | 85 |
| Stearic acid | 2 |
| Zinc oxide | 5 |
| Antioxidant D [2] | 1.0 |
| Vulcanizing accelerator CZ [3] | 0.9 |
| Sulfur | 1.6 |

[1] Process oil having a specific gravity of 0.9506 and V.G.C. of 0.9605.
[2] Phenyl-β-naphthylamine.
[3] N-cyclohexylbenzothiabylsulfenamide.

The mixing were carried out in accordance with the procedures shown in Table 3. Temperatures were 120° C. at the first step of mixing and 90° C. at the second step of mixing.

TABLE 3

1st step of mixing:
 0 min.—charged with the polymer.
 0.5 min.—charged with zinc oxide, stearic and antioxidant D.
 1.0 min.—charged with the entire amount of carbon black.
 3.0 min.—charged with process oil.
 6.0 min.—discharged.

2nd step of mixing:
 0 min.—charged with the mixture from the 1st step.
 0.5 min.—charged with accelerator D and sulfur.
 3.0 min.—discharged.

Table 4 shows mixing properties and dispersing ratios of carbon black after the first step of mixing of various copolymer rubber compounds.

TABLE 4

Dispersion ratio of carbon black (percent)[1]

| | |
| --- | --- |
| Butadiene-styrene copolymer rubber in the Example A | 95 |
| Butadiene-styrene copolymer rubber in the Comparative Example B | 80 |
| Butadiene-styrene copolymer rubber in the Comparative Example C | 80 |
| Comparative Example SBR–1712 | 90 |

[1] Specimen of a compound is compressed, degassed and formed into a small piece about 2.5 x 7 x 5 m./m. The specimen is then immersed in carbon disulfide solution containing 1–3% sulfur chloride at −70° C. for about 10 hrs. followed by standing at room temperature fr about 2 hrs. to remove the solvent. The resulting specimen is dried in vacuo for about 10 hrs. to effect cold vulcanization with sulfur chloride. There is given a specimen homogeneous in hardness, which is frozen in liquid nitrogen and cut into slices $2\mu$ in thickness by a microtome. Dispersion of carbon black is examined under an optical microscope in 100 magnifications. In order to express the state of dispersion numerically, the eye lens is provided with a scale of 100 x 100 sections and the scale lines and the lens system is set in such a way that one section corresponds to an area of 13 x $13\mu$. Thus, the ratio of the sections with a side covered by more than half by carbon black aggregates in a given field of vision of the 100 x 100 sections is estimated and expressed by calculation as the dispersion ratio of carbon black.

As clearly shown in Table 4, the dispersing property of a composition which contains a rubbery butadiene-styrene random copolymer having a relaxation time within the scope of this invention is far superior to those of prior solution polymerized rubbery butadiene-styrene copolymers (B and C) and at least equal to the emulsion polymerized rubbery butadiene-styrene copolymer. This fact is indicative of improvement in Banbury mixing properties of the compositions of this invention.

Accordingly, the compositions of this invention are advantageous also in that the time required for the mixing step of fillers in the production of the tire can be reduced.

Then, the four compounds were extruded using a Garvey Die extruder to obtain the results shown in Table 5.

TABLE 5

|  | Example A compound | Comparative example— | | |
|---|---|---|---|---|
|  |  | B compound | C compound | SBR-1712 compound |
| Rate of extrusion (kg./hr.) | 70 | 50 | 48 | 68 |
| Extrudate appearance | 5 | 4 | 4 | 4 |
| State of edge | Good | Poor | Poor | Good |

Extruding conditions:
Compounding temperature, 100° C.
Rotation of the screw, 50 r.p.m.
Screw temperature (cooled with water) 23-24° C.
Die temperature, 100° C.

As indicated in Table 5, the Compound A of this invention produced better effects in rate of extrusion, extrudate appearance and state of edge than those with the prior solution polymerized SBR and emulsion polymerized SBR.

Next, the four compounds were press vulcanized at 140° C. for 30 min. and the physical properties measured to give the results shown in Table 6.

TABLE 6

|  | Example A vulcanized product | Comparative example— | | |
|---|---|---|---|---|
|  |  | B vulcanized product | C vulcanized product | SBR-1712 vulcanized product |
| Hardness [1] | 62 | 63 | 62 | 63 |
| 300% tensile modulus (kg./cm.[2]) [1] | 105 | 99 | 103 | 121 |
| Tensile strength (kg./cm.[1]) | 185 | 180 | 180 | 200 |
| Elongation (percent) [1] | 520 | 500 | 500 | 470 |
| Tear strength (kg./cm.) [1] | 43 | 38 | 37 | 35 |
| Impact resilience at— |  |  |  |  |
| 20° C.[2] | 46 | 45 | 46 | 34 |
| 70° C.[2] | 57 | 56 | 56 | 51 |
| Slip resistance on a wet road surface [3] | 102 | 89 | 87 | 100 |
| Slip resistance on ice surface [3] | 115 | 110 | 109 | 100 |

[1] Measured under the conditions of JIS K-6301.
[2] Measured using a Dunlop Trypsometer.
[3] Coefficient of gravity friction of the tire tread rubber was measured using a slip resistance measuring instrument developed by Road Research Laboratory of England on the wet asphalt road surface and ice surface.

As shown in Table 6, the vulcanized product of the composition of this invention exerted improved impact resilience and slip resistances on a wet road surface and an ice surface, being particularly desired physical properties in tire tread.

As evidently demonstrated by the results set forth above, the tire tread composition of this invention containing as the rubber component the solution polymerized rubbery butadiene-styrene random copolymer with a longer relaxation time was excellent in carbon black dispersing property, extrusion processing property as well as physical properties, especially impact resilience and slip resistance being most important for the use as tire tread.

EXAMPLE 2

The three rubbery butadiene-styrene copolymers (A)-(C) prepared in Example 1 and emulsion polymerized SBR-1712 as reference for comparison, respectively, were compounded by a 11 type Banbury mixer in accordance with the ratio of compounding given in Table 7, and the compounds were then extruded using a commercial extruder to a form of tire tread. The resulting tire tread was stuck to a raw tire (tire size 6.40-14) containing a carcass composed of emulsion polymerized butadiene-styrene copolymer rubber compound and nylon tire cord, followed by vulcanization at the standard vulcanizing temperature to give a finished tire.

TABLE 7

|  | Parts by weight |
|---|---|
| Rubbery butadiene-styrene copolymer | 137.5 |
| Aromatic process oil [1] | 12.5 |
| ISAF grade carbon black | 85 |
| Stearic acid | 2 |
| Zinc oxide | 3 |
| Vulcanizing accelerator NS [2] | 1.6 |
| Sulfur | 1.4 |
| Antioxidant AW [3] | 1 |
| Antioxidant B [4] | 1 |
| Paraffin wax | 2 |

[1] A process oil with a V.G.C. of 0.951 and a specific gravity of 0.9988.
[2] n-Hydroxydiethylene-2-benzothiazylsulfenamide.
[3] 6-ethoxy-,2,2,4-trimethyl1,2-dihydroquinoline.
[4] A reaction product of disphenylamine and acetone at a high temperature.

Utility cars were set up with the five finished tires thus produced and tested for the heat generation inside the tire and abrasion resistance on travelling.

Table 8 shows processing properties in forming into the tire, and control stability and abrasion index on travelling.

TABLE 8

|  | Example A compound | Comparative Example— | | |
|---|---|---|---|---|
|  |  | B compound | C compound | SBR-1712 compound |
| Processability | Good | Poor | Poor | Good |
| Temperature by heat generation inside the tire (° C.) [1] | 60 | 62 | 61 | 80 |
| Tire abrasion index [2] | 125 | 124 | 125 | 100 |
| Slip resistance on a wet road surface: |  |  |  |  |
| Controllability on a road [3] | 105 | 85 | 85 | 100 |
| Brake applicability [4] | 102 | 80 | 80 | 100 |
| Pulling capacity [5] | 900 | 90 | 90 | 100 |

[1] Temperature difference between the inside of the tire tube and the environment as measured by a thermocouple when travelled at a speed of 100 kg./hr.
[2] Taking the abrasion resistance with the SBR-1712 compound as 100.
[3] Controllability on a road estimated from the maximum speed at which the tire slips while accelerating the car equipped with the tested tire driving on a circle 5 m. in radius, taking that with the SBR-1712 compound as 100.
[4] Brake applicability estimated from the distance from sudden application of brakes when driven at a speed of 20 km./hr. to complete standstill of the tire, taking that with the SBR-1712 compound as 100.
[5] Pulling capacity when the tire is rotated at a rate of 800 r.p.m., taking the pulling capacity with the SBR-1712 compound as 100.

As shown in Table 8, while the processing property of the compound of this invention was excellent, that with the solution polymerized SBR with a shorter relaxation time was poor.

As for the physical properties for practical use as tire tread, while the composition of this invention is excellent in both abrasion resistance and control stability, the tires from the known solution polymerized SBR (B and C) compounds are good in abrasion resistance but poor in control stability and, on the other hand, the tire from emulsion polymerized SBR–1712 compound is good in control stability but very poor in abrasion resistance.

The above-mentioned data indicate that the composition of this invention is well balanced between processing properties and physical properties for practical use.

EXAMPLE 3

Two rubbery butadiene-styrene random copolymers having different relaxation times were prepared using the same polymerization reactors as in Example 1, n-butyllithium, tetrahydrofuran as the additive for randomization and n-hexane as the solvent. Conditions of the preparation and representative properties of the rubbers are given in Table 9.

TABLE 9

| | Example (D) | Comparative Example (E) |
|---|---|---|
| Polymerization condition: | | |
| Butadiene/styrene (weight ratio) | 75/25 | 75/25 |
| Monomer concentration (wt. percent) | 20 | 20 |
| Butyllithium (per 100 parts by weight of the entire monomers) | 0.09 | 0.04 |
| Concentration of tetrahydrofuran (wt. percent) | 0.5 | 0.5 |
| Polymerization temperature (° C.) | 130 | 130 |
| Residence time (hr.) | 2 | 0.5 |
| Basic physical property: | | |
| Content of bound styrene (percent) | 25.0 | 25.0 |
| Content of block styrene (percent) | 0.1 | 0.1 |
| Butadiene bond structure: | | |
| Cis-1,4-linkage | 26 | 25 |
| Trans-1,4-linkage | 46 | 47 |
| 1,2-linkage | 28 | 28 |
| Mooney viscosity (ML$_{1+4}$, 100° C.) | 55.0 | 55.0 |
| Relaxation time (sec.) | 35.0 | 2.0 |

The two butadiene-styrene copolymers thus prepared were mixed using a B type Banbury mixer in accordance with the composition shown in Table 10.

TABLE 10

| | Parts by weight |
|---|---|
| Rubbery butadiene-styrene copolymer | 60 |
| Low-cis polybutadiene [1] | 40 |
| Aromatic process oil [2] | 50 |
| HAF grade carbon black | 90 |
| Stearic acid | 2 |
| Zinc oxide | 3 |
| Vulcanizing accelerator CZ | 1.2 |
| Sulfur | 1.6 |
| Antioxidant D | 1.0 |

[1] Polybutadiene polymerized with a lithium catalyst, ML $_{1+4}$ = 35.
[2] A process oil with a V.G.C. of 0.951 and a specific gravity of 0.9880.

Procedures for mixing were the same as in Example 1.

A stock of each of the two rubbery butadiene-styrene random copolymers was extruded by means of a Garvey die extruder with the result, shown in Table 11.

TABLE 11

| | Example Compound (D) | Comparative example Compound (E) |
|---|---|---|
| Rate of extrusion (kg./hr.) | 65 | 40 |
| Extrudate appearance | 5 | 3 |
| State of edge | Good | Poor |

The conditions under which the extrusion was conducted were the same as in Table 5.

The results in Table 11 evidently demonstrate that the composition containing the copolymer rubber having a longer relaxation time is superior in every property measured of rate of extrusion, extrudate appearance and state of edge.

Next, the two compounds were extruded by means of a commercial extruder into a form of tire tread, and the respective tire tread was stuck to a raw tire (tire size 6.40–14) comprising carcass composed of emulsion polymerized rubbery butadiene-styrene copolymer compound and nylon tire cord, followed by vulcanization at the standard vulcanization temperature to produce a finished tire.

Physical properties of the two tire treads thus obtained were measured with the results shown in Table 12.

Methods of the measurement were the same as in Table 8.

TABLE 12

| | Example tire, Compound D | Comparative example tire, Compound E |
|---|---|---|
| Temperature inside the tire | 65 | 71 |
| Abrasion index of the tire | 105 | 100 |
| Slip resistance on a wet road surface: | | |
| Controllability on a road | 120 | 100 |
| Brake application capacity | 118 | 100 |
| Pulling capacity | 122 | 100 |

As indicated in Table 12, the composition of the present invention is beyond the performance of the prior rubber particularly in exhibiting both good control stability on a wet road surface and abrasion resistance, as compared with the tire containing the prior emulsion polymerized SBR.

EXAMPLE 4

Three rubbery butadiene-styrene random copolymers having different relaxation times were prepared using the same reactors as in Example 1, hexane as the solvent and the same randomizing process as in Example 1. Conditions used for the preparation and properties of the rubbery copolymers are shown in Table 13.

TABLE 13

| | Example F | Comparative Example G | Comparative Example H |
|---|---|---|---|
| Polymerization conditions: | | | |
| Ratio of the monomers: Butadiene/styrene (weight ratio) | 82/18 | 82/18 | 82/18 |
| Concentration of the monomers (weight percent) | 25 | 25 | 25 |
| Butyllithium (per 100 parts by weight of the entire monomers) | 0.08 | 0.04 | 0.10 |
| Polymerization temperature (° C.) | 140 | 110 | 150 |
| Residence time (hr.) | 2 | 0.5 | 3.0 |
| Basic physical properties: | | | |
| Content of combined styrene (percent) | 18.0 | 18.0 | 18.0 |
| Content of block styrene (percent) | 0.2 | 0.2 | 0.2 |
| Butadiene bond structure: | | | |
| Cis-1,4-linkage | 41 | 41 | 41 |
| Trans-1,4-linkage | 48 | 48 | 47 |
| 1,2-linkage | 11 | 11 | 12 |
| Mooney viscosity | 95 | 92 | 93 |
| Relaxation time (sec.) | 62 | 5 | 250 |

The three rubbery copolymers produced were compounded by means of a B type Banbury mixer in accordance with the compounding proportions shown in Table 14.

TABLE 14

| | Parts by weight |
|---|---|
| Copolymer rubber | 60 |
| Emulsion polymerized rubbery butadiene/styrene copolymer (SBR-1712) | 55 |
| Aromatic process oil [1] | 35 |
| HAF grade carbon black | 85 |
| Stearic acid | 2 |
| Zinc oxide | 5 |
| Vulcanizing accelerator CZ | 0.9 |
| Sulfur | 1.6 |
| Antioxidant AW | 1.0 |
| Antioxidant B | 1.0 |
| Paraffin wax | 2.0 |

[1] A process oil with a V.G.C. of 0.988 and a specific gravity of 0.9991.

The method of mixing was the same as in Example 1.

Dispersion ratio of carbon black was measured after the first step of mixing by the same method as in Example 1 with the results shown in Table 15.

TABLE 15

| | Dispersion ratio of carbon black (percent) |
|---|---|
| Example copolymer rubber (F) compound | 98 |
| Comparative example copolymer rubber (G) compound | 82 |
| Comparative example copolymer rubber (H) compound | 80 |

As shown in Table 15, the composition of this example exhibited excellent dispersion of carbon black.

This indicates that the mixing with carbon black is poor in cases where the relaxation time is beyond the scope defined in this invention.

Next, the three compounds thus obtained were extruded into a form of the tire tread by means of a commercial extruder. Extrudability was estimated and the respective tire tread from the extrusion was stuck to a raw tire (tire size 6.40–14) comprising carcass composed of emulsion polymerized butadiene-styrene copolymer rubber composition and nylon tire cord, followed by vulcanization at the standard vulcanization temperature to produce a finished tire.

Physical properties for practical use of the three tire treads thus produced as well as the extrudabilities are shown in Table 16.

TABLE 16

| | Example copolymer rubber F compound | Comparative example copolymer rubber— | |
|---|---|---|---|
| | | G compound | H compound |
| Rate of extrusion [1] | 125 | 100 | 125 |
| Temperature by heat generation inside the tire (° C.) | 70 | 75 | 90 |
| Abrasion index of the tire [2] | 102 | 100 | 80 |
| Slip resistance on a wet road surface: | | | |
| Controllability on a road | 115 | 100 | 117 |
| Brake application capacity | 120 | 100 | 117 |
| Pulling capacity | 110 | 100 | 112 |

[1] The rate of extrusion with the comparative example copolymer rubber Compound G was taken as 100.
[2] The abrasion index of the tire with the comparative example copolymer rubber Compound G was taken as 100.

As indicated in Table 16, whereas the composition of this invention is excellent in rate of extrusion and possesses well balanced properties both in abrasion resistance and in slip resistance on a wet road surface, the compound in which the copolymer rubber with a shorter relaxation time is used in inferior in slip resistance on a wet road surface in spite of the high abrasion resistance and, on the contrary, the compound in which the copolymer rubber with an extremely long relaxation time is used in inferior in heat generation inside the tire and abrasion resistance in spite of the good extrudability and slip resistance on a wet road surface.

EXAMPLE 5

The three rubbery butadiene-styrene random copolymers with different relaxation times prepared in Example 4, Example F, Comparative Examples G and H, were mixed according to the composition indicated below.

TABLE 7

| | Parts by weight |
|---|---|
| Copolymer rubber | 60 |
| Polybutadiene rubber [1] | 40 |
| Aromatic process oil [2] | 50 |
| HAF grade carbon black | 85 |
| Stearic acid | 2 |
| Zinc oxide | 5 |
| Vulcanizing accelerator CZ | 0.9 |
| Sulfur | 1.6 |
| Antioxidant AW | 1.0 |
| Antioxidant B | 1.0 |
| Paraffin wax | 2.0 |

[1] Solution polymerized rubbery polybutadiene containing: cis-1,4-linkage, 97%; trans-1,4-linkage, 1%; 1,2-linkage, 2.0%.
[2] A process oil with a V.G.C. of 0.9539 and a specific gravity of 1.000.

In addition, a single compound containing 100 parts by weight of polybutadiene rubber with no other compounded materials changed was prepared.

The conditions for the mixing were the same as in Example 1.

The results of the extrusion of the four compounds thus obtained are shown below.

TABLE 18

| | Example F blend compound | Comparative Example— | | Polybutadiene single compound |
|---|---|---|---|---|
| | | G blend compound | H blend compound | |
| Rate of extrusion (kg./hr.) | 58 | 35 | 59 | 35 |
| Extrudate appearance | 5 | 4 | 5 | 3 |
| State of edge | Good | Poor | Good | Poor |

As set forth above, the Example F blend compound exhibits remarkably improved extrudability as compared with polybutadiene cross linked compound, whereas the Comparative Example G blend compound with a relaxation time shorter than the range of this invention shows no particular improvement in this capacity. Furthermore, it is noticeable that the Comparative Example H blend compound with a longer relaxation time than the range of this invention exerts an improved effect comparable to that of the example blend compound.

Next, the four compounds thus obtained were formed into treads and stuck to tires by the same procedures as in Example 4 to give finished tires.

Properties of the four tires for practical use are shown in Table 19.

TABLE 19

|  | Example copolymer rubber F compound | Comparative example copolymer rubber— | | Polybutadiene single compound |
|---|---|---|---|---|
|  |  | Compound G | Compound H |  |
| Temperature by heat generation inside the tire (° C.) | 60 | 65 | 90 | 60 |
| Abrasion index of the tire | 100 | 95 | 75 | 100 |
| Slip resistance on a wet road surface: Brake application capacity | 100 | 85 | 100 | 75 |

As shown in the table above, the example copolymer rubber F, when used in blend with polybutadiene, is equivalent to polybutadiene alone in abrasion resistance and heat generation, the both capacities being characteristice of polybutadiene rubber, and on the other hand, the former exerts remarkable improvement in slip resistance on a wet road surface being deflective of the latter. That is to say, by blending merits in the two are more developed, whereas the demerits are corrected, thereby producing outstanding synergistic effects.

EXAMPLE 6

Four reactors, each 10 liter in volume and equipped with a jacket, were connected in series with pipes. The first reactor was fed with n-hexane, butadiene and styrene respectively at rates of 131.6 g., 21.8 g. and 11.1 g. per minute while introducing n-butyllithium at such a ratio that the n-butyllithium was 0.06 part by weight per 100 parts by weight of the entire monomers. Into the second reactor were fed n-hexane and butadiene respectively at rates of 26.4 g. and 6.6 g. per minute, into the third reactor n-hexane and butadiene respectively at rates of 13.6 g. and 3.4 g. per minute and into the fourth reactor n-hexane and butadiene respectively at rates of 6.8 g. and 1.7 g. per minute. While maintaining the maximum temperature in the reactors at 130° C., solutions of a butadiene-styrene random copolymer were continuously produced. To the solution was added as the stabilizer 2,6-di-tert.-butyl-p-cresol, followed by addition of an aromatic process oil at a ratio of 37.5 parts by weight per 100 parts by weight of the polymer. The n-hexane was then removed to give an oil extended polymer. Polymerization conditions and analytical values for the polymer obtained are shown in Table 20 (called Polymer 6A).

Next, a random copolymer according to U.S. Pat. 3,294,768 (called reference process hereinbelow) was produced for comparison's sake by the procedures set forth below.

Two reactors, each 10 liter in volume and equipped with a jacket, were connected in series with pipes. Into the first reactor were fed n-hexane, butadiene and styrene respectively at rates of 357.6 g., 67.1 g. and 22.3 g. per minute, while introducing a mixed solution at a 10:1 molar ratio of n-butyllithium and potassium t-butoxide at a rate of 0.07 part by weight of the n-butyllithium per 100 parts by weight of the entire monomers. While maintaining the temperature of the reactors at 50° C., solutions of a butadiene-styrene random copolymer were continuously produced. Additions of the stabilizer and the process oil in the same amounts as above and removal of the n-hexane were followed to give an oil extended polymer. Polymerization conditions and analytical value for the polymer obtained are shown in Table 20 (called Polymer 6B).

A further comparative polymerization was made batchwise to give a random copolymer by the procedures set forth below.

In a 10 liter reactor equipped with a jacket were placed 4.0 kg. of n-hexane, 0.75 kg. of butadiene and 0.25 g. of styrene, followed by addition of a mixed solution at a 10:1 molar ratio of n-butyllithium and potassium t-butoxide at a rate of 0.07 part by weight of the n-butyllithium per 100 parts by weight of the entire monomers.

After initiation of the polymerization the temperature was adjusted to 130° C., at which temperature was conducted the polymerization for 2 hours. The resulting polymer was dried in the same way as above. Polymerization conditions and analytical values for the polymer obtained are shown in Table 20 (called Polymer 6C).

TABLE 20

|  | Copolymer A of the present invention | Reference process | |
|---|---|---|---|
|  |  | Copolymer B | Copolymer C |
| Polymerization process | Continuous | Continuous | Batch |
| Polymerization condition, temperature | [1] 130° C. | [1] 50° C. | [2] 130° C. |
| Analysis of the polymer: | | | |
| Bound styrene (percent)[3] | 24.8 | 25.0 | 24.9 |
| Block styrene (percent)[4] | 0.3 | 0 | 0 |
| Butadiene bonding pattern:[3] | | | |
| Cis 1,4 | 40.5 | 38.0 | 37 |
| Trans 1,4 | 48.5 | 51.0 | 51 |
| Vinyl 1,2 | 11.0 | 11.0 | 12 |
| Mooney viscosity[5] | 105 | 101 | 94 |
| Relaxation time[6] | 65 | 4 | 6 |
| Mooney viscosity after the oil extension[5] | 45.0 | 43.0 | 41.0 |

[1] Average residence time, 120 minutes.
[2] Polymerization time, 120 minutes.
[3] Styrene content and butadiene bond structure were measured using an infrared spectrophotometer and calculated according to the method of Hampton.
[4] To a solution of 2 parts by weight of the butadiene-styrene copolymer in 100 parts by weight of carbon tetrachloride were added 5 parts by weight of tertiary butyl hydroperoxide and then 0.01 part by weight of osmium tetroxide. The mixture was heated at 80° C. for 15 min. to effect the decomposition. Precipitates formed by adding a large amount of methanol to the resulting solution are the block styrene. The precipitates were separated by filtration, dried in vacuo, weighed and the amount of block styrene calculated as percent by weight in the rubbery butadiene-styrene copolymer.
[5] Measured by using Mooney viscometer having a large rotor at 100° C. according to ASTM D-1646-61.
[6] Measured by using Mooney viscometer according to ASTM D-1646 by rotating the rotor for 4 minutes, then putting off the clutch to stop the rotation of the rotor and determining the time (sec.) until reading of the gauge becomes 20% of the Mooney viscosity immediately before release of the clutch.

Then, the two solutions polymerized SBR A and B thus prepared were compounded in the proportions indicated in Table 21 by means of a Banbury mixer in accordance with the procedures shown in Table 22. Temperatures were 120° C. at the first step of mixing and 90° C. at the second step of mixing.

TABLE 21

| | Parts by weight |
|---|---|
| Oil extended copolymer rubber | 137.5 |
| Aromatic process oil [1] | 12.5 |
| HAF grade carbon black | 85 |
| Stearic acid | 2 |
| Zinc oxide | 5 |
| Antioxidant D [2] | 1.0 |
| Vulcanizing accelerator CZ [3] | 0.9 |
| Sulfur | 1.6 |

[1] Process oil having a specific gravity of 0.9506 and V.G.C. of 0.9605.
[2] Phenyl-β-naphthylamine.
[3] N-cyclohexylbenzothiazylsulfenamide.

TABLE 22

First step of mixing:
- 0 min.—charged with the polymer.
- 0.5 min.—charged with zinc oxide, stearic and antioxidant D.
- 1.0 min.—charged with the entire amount of carbon black.
- 3.0 min.—charged with process oil.
- 6.0 min.—discharged.

Second step of mixing:
- 0 min.—charged with the mixture from the first step.
- 0.5 min.—charged with accelerator CZ and sulfur.
- 3.0 min.—discharged.

Next, the two polymers were examined for mixing properties after the first step of mixing in terms of the dispersing ratio of carbon black, for extrusion processability in terms of the extruding properties using a Garvey Die extruder and for physical properties in terms of physical properties after press vulcanized at 140° C. for 30 minutes. The results are shown in Table 23.

TABLE 23

| | Copolymer of the— | |
|---|---|---|
| | Present invention, A | Reference process, B |
| Non-vulcanized product: | | |
| Dispersing ratio of carbon (percent)[1] | 96 | 82 |
| Garvey die extruding properties:[2] | | |
| Rate of extrusion (kg./hr.) | 68 | 49 |
| Extrudate appearance | 5 | 4 |
| State of edge | Good | Poor |
| Physical properties of vulcanized product: | | |
| Hardness[3] | 62 | 62 |
| 300% tensile modulus (kg./cm.$^2$)[3] | 104 | 100 |
| Tensile strength (kg./cm.$^2$)[3] | 185 | 185 |
| Elongation (percent)[3] | 500 | 500 |
| Impact resilience (20° C.)[4] | 45 | 46 |
| Impact resilience (80° C.)[4] | 58 | 59 |
| Slip resistance on the wet road surface[5] | 100 | 90 |
| Slip resistance on ice surface[5] | 100 | 91 |

[1] Specimen of a compound is compressed, degassed and formed into a small piece about 2.5 x 7 x 5 m./m. The specimen is then immersed in carbon disulfide solution containing 1–3% sulfur chloride at −70° C. for about 10 hrs. followed by standing at room temperature for about 2 hrs. to remove the solvent. The resulting specimen is dried in vacuo for about 10 hrs. to effect cold vulcanization with sulfur chloride. There is given a specimen homogeneous in hardness, which is frozen in liquid nitrogen and cut into slices 2μ in thickness by a microtome. Dispersion of carbon black is examined under an optical microscope in 100 magnifications. In order to express the state of dispersion numerically, the eye lens is provided with a scale of 100 x 100 sections and the scale lines and the lens system is set in such a way that one section corresponds to an area of 13 x 13μ. Thus, the ratio of the sections with a side covered by more than half by carbon black aggregates in a given field of vision of the 100 x 100 sections is estimated and expressed by calculation as the dispersion ratio of carbon black.

[2] Extruding conditions:
Compounding temperature, 100° C.
Rotation of the screw, 50 r.p.m.
Screw temperature (cooled with water) 23–24° C.
Die temperature, 100° C.

[3] Measured under the conditions of JIS K–6301.

[4] Measured using a Dunlop Trypsometer.

[5] Coefficient of gravity friction of the tire tread rubber was measured using a slip resistance measuring instrument developed by Road Research Laboratory of England on the wet asphalt road surface and ice surface.

As indicated by the data in Table 20, Copolymer 6A of the present invention obtained by a continuous polymerization at a temperature as high as 130° C. is a branched polymer with much entanglement and has a longer relaxation time than that of Polymer 6B according to the reference obtained by a continuous polymerization at a temperature as low as 50° C. Furthermore, difference in structure between the copolymer of the present invention and the copolymer obtained by the batch process is apparent in view of the relaxation time of 65 seconds with the former, and 6 seconds with the latter.

The copolymer used in the present invention is different from the copolymer in the reference not only in the preparative process but also in the resulting rubber, particularly in relaxation time.

Next, explanation is made of the data in Table 23 relative to the fact that the rubber obtained according to the present invention is superior in many respects.

When one considers as the first factor degree of the dispersion of carbon black when compounded in a Banbury mixer, one of the processability of the non-vulcanized rubber, good dispersability of the copolymer according to the present invention is apparent so that a rationalization of the process for compounding fillers in the tire producing step can be advantageously expected.

The results for extrusion processability indicates that the rubber according to the present invention is excellent in every respect in view of the results for rate of extrusion, extrudate appearance and state of edge.

Moreover, physical properties of the vulcanized rubber of the present invention are almost the same with respect to hardness, tensile properties and impact resilience as, but are superior in slip resistances on the wet road surface as well as on ice surface to, those of the reference process.

As described above, the solution polymerized SBR with a long relaxation time is excellent in carbon black dispensability and extrusion processability and comparative or superior in physical properties as compared with the rubber of the reference process (U.S. Pat. 3,294,768). As a matter of fact, the former composition evidently represents improvement in slip resistance on a wet road surface with no deterioration in good properties such as impact resilience of the solution polymerized rubber and also much improvement in processability, which is not satisfactory with known solution polymerized rubbers. Compositions according to the present invention have physical properties superior to known solution polymerized SBR.

We claim:

1. Rubber compositions suitable for tire tread with improved processability comprising from 25 to 75 parts by weight of a process oil having a viscosity-specific gravity constant not less than 0.850 and from 40 to 100 parts by weight of carbon black per 100 parts by weight of a rubber component containing at least 30% by weight of rubbery butadiene-styrene random copolymer, and 70% or less of at least one member selected from the group consisting of natural rubber, emulsion polymerized rubbery butadiene-styrene copolymer, emulsion polymerized rubber polybutadiene, solution polymerized rubbery low-cis and high-cis polybutadiene, rubbery polybutadiene and rubbery butadiene-styrene copolymer polymerized with an alfin catalyst, rubbery polyisoprene and rubbery butadiene-isoprene copolymer, said rubbery butadiene-styrene random copolymer being polymerized in a continuous process with a catalyst consisting of lithium or an organolithium compound at a temperature of from 120° C. to 180° C. with an average residence time of from 1 to 3 hours, containing from 5 to 30% by weight of styrene and at least 60% of 1,4-linkage in butadiene units thereof, and having a Mooney viscosity (at 100° C. at a rotor rate of 2 r.p.m.) of from 40 to 150 and a relaxation time of from 20 to 200 sec. as measured by a Mooney viscometer, said relaxation time being the time following normal measurement of the Mooney viscosity for the Mooney viscometer reading to reach a value of 20% of the Mooney viscosity value immediately before stopping of the rotor of said viscometer.

2. Rubber compositions of claim 1, wherein said process oil has a viscosity-specific gravity constant of at least 0.900.

3. Rubber compositions of claim 1, wherein said rubbery butadiene-styrene random copolymer is obtained by a continuous process for polymerizing butadiene and styrene in the presence of said catalyst, wherein a monomer mixture containing excess styrene is charged initially and additional butadiene is continuously or intermittently charged to the reaction system.

References Cited
UNITED STATES PATENTS
2,877,200  3/1959  Carpenter _____ 260—83.7

FOREIGN PATENTS
903,331  8/1962  Great Britain.
994,726  6/1965  Great Britain.

OTHER REFERENCES
Vanderbilt Rubber Handbook, 11th ed., R. T. Vanderbilt Co., N.Y., Oct. 22, 1968, pp. 54–56.

ALLAN LIEBERMAN, Primary Examiner
H. H. FLETCHER, Assistant Examiner

U.S. Cl. X.R.

260—33.6 A, 41.5 R, 83.7, 94.2 M; 152—330

UNITED STATES PATENT OFFICE
CERTIFICATE OF CORRECTION

Patent No. 3,795,651          Dated  March 5, 1974

Inventor(s) KORETAKA YAMAGUCHI et al

It is certified that error appears in the above-identified patent and that said Letters Patent are hereby corrected as shown below:

Column 6, lines 30 and 31:  delete and replace with:

---In addition to process oil and carbon black, the compounding agents used in this invention may include zinc--- .

Signed and sealed this 19th day of November 1974.

(SEAL)
Attest:

McCOY M. GIBSON JR.
Attesting Officer

C. MARSHALL DANN
Commissioner of Patents